B. H. KRAFFT.
ATTACHMENT FOR WIND SHIELDS AND THE LIKE.
APPLICATION FILED DEC. 3, 1909.
1,119,177.    Patented Dec. 1, 1914.
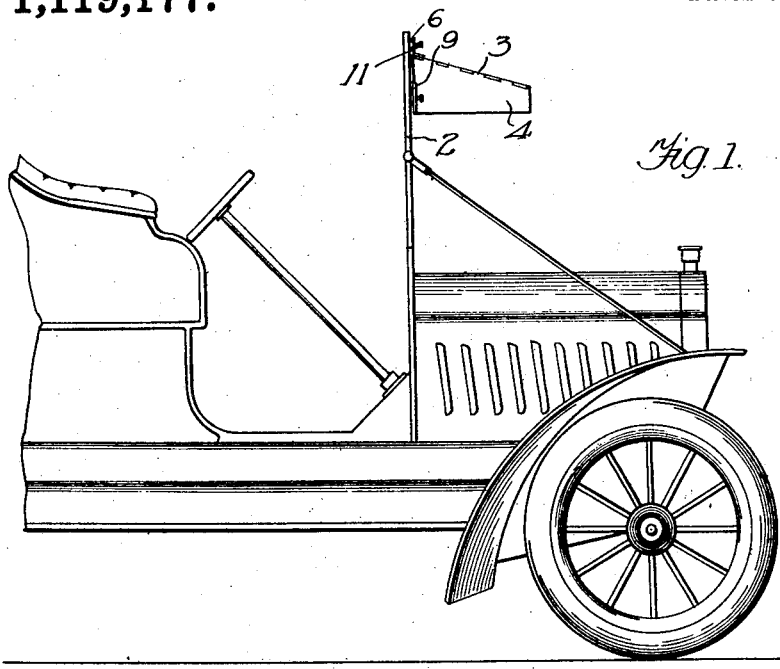
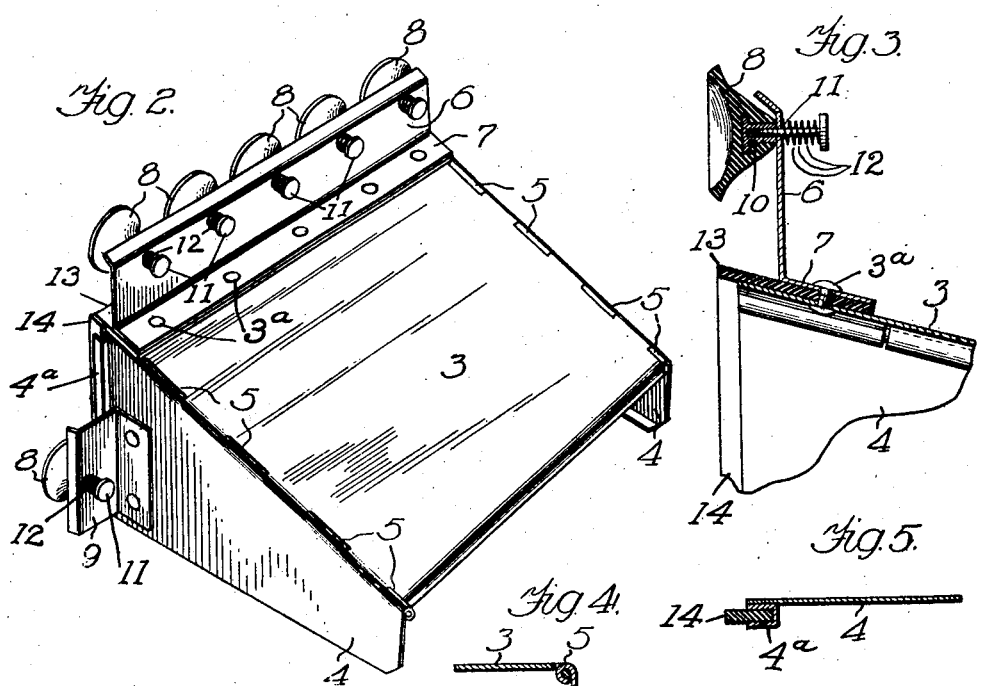

UNITED STATES PATENT OFFICE.

BERT HENRY KRAFFT, OF CHICAGO, ILLINOIS, ASSIGNOR, BY MESNE ASSIGNMENTS, TO STORM SHIELD MFG. CO., OF CHICAGO, ILLINOIS, A CORPORATION OF ILLINOIS.

ATTACHMENT FOR WIND-SHIELDS AND THE LIKE.

1,119,177.  Specification of Letters Patent.  Patented Dec. 1, 1914.

Application filed December 3, 1909. Serial No. 531,134.

*To all whom it may concern:*

Be it known that I, BERT HENRY KRAFFT, a citizen of the United States, residing at Chicago, in the county of Cook and State of Illinois, have invented a new and useful Improvement in Attachments for Wind-Shields and the like, of which the following is a specification.

My invention relates to an attachment for protecting transparent surfaces or members from extraneous matter and while it has been particularly designed for use on automobile wind shields, the same is intended for any and all uses to which it is applicable. The attachment is so constructed and arranged that it may be readily attached and detached from the transparent surface on which it is to be used, which feature is of particular advantage when the attachment is used for instance on automobile wind shields or on the front of trolley cars when it is desired under inclement weather conditions to quickly and conveniently apply the attachment at the desired height according to the range or plane of vision of the chauffeur or motorman and to as quickly and conveniently remove or detach the same when desired.

Other features of advantage and utility in my attachment will be apparent from the description hereinafter given.

In the drawing Figure 1 is a side elevation of my device shown attached to the wind shield of an automobile; Fig. 2 a perspective of the device or attachment; Fig. 3 a cross-section of one of the suckers employed and the supporting bracket thereof; Fig. 4 a detail view illustrating a part of the top portion or hood proper and one of the side wings hinged thereto; and Fig. 5 a detail view of an inner portion of one of the side wings of the attachment.

For the purpose of affording a clear and definite understanding of my invention I will describe the same in connection with an automobile wind shield 2 although it will be understood that I contemplate using or applying my invention wherever applicable.

The device or attachment is in the nature of a hood comprising the top portion or hood proper indicated at 3 and depending side wings 4 which are hinged at 5 to the side edges of the hood proper as clearly indicated in Fig. 2. For the purpose of enabling the attachment to be removably held in place on the wind shield in a simple manner and to be readily attached and detached therefrom, I employ a plurality of suckers which are operatively connected with the hood proper and by preference also with the side wings referred to. To this end the hood proper is provided with a bracket consisting of an upright portion 6 and a foot portion 7 secured in any suitable manner to the top portion 3 or hood proper. This bracket in the present instance carries a plurality or series of suckers 8, here shown as five in number, although obviously any desired number may be employed. Likewise the side wings 4 are provided with suckers which are mounted in brackets 9 projecting outwardly therefrom as clearly shown in Fig. 2. All of the suckers are operatively connected with their brackets in suitable manner and are normally spring-pressed inwardly toward such brackets. As shown in detail in Figs. 2 and 3 each sucker 8, which is preferably in the form of a rubber cup, has embedded in its body or rearward portion a nut 10 into which screws a rod or plunger 11 extending forwardly through holes in its bracket. Each sucker is held spring-pressed forwardly by means of the coiled spring 12 surrounding the outer or forward end of its plunger as clearly shown in Fig. 3. As shown in detail in Figs. 3 and 5 provision is made for a tight or sealed fit between the attachment and the wind shield glass, and in the present instance the same consists of suitable yielding strips 13 and 14 of rubber or the like and secured respectively to the hood proper marked 2 and the side wings 4. As shown the strip 13 is secured in place by the same rivets 3ª which secure the bracket foot 7 to the hood proper and the strips 14 are held or clamped in strips 4ª secured in any suitable manner to the sides of the wings 4.

As shown in the drawing the side wings are hinged to the hood proper with the result that the wings are movable so as to permit of folding into compact form and also to be moved to any suitable position on the wind shield so as not to interfere with the usual side frame of such shield.

It will be understood that this attachment is not permanently applied to its place of use but is applied or attached only during inclement weather although of course it might, if desired, be used all of the time. In order to provide for this condition and to enable it to be readily carried on the machine when not in use it is made of the folding or compact form illustrated and moreover in order that it may be readily and quickly attached and detached it is provided with the suckers described. In addition the particular construction of sucker and associated parts is desirable inasmuch as it facilitates the application of the attachment in place. In practice the operator, while holding the attachment up against the windward side of the wind shield, forces the suckers against the glass or transparent member by pressing rearwardly against the plungers 11.

I claim:

1. The combination with a member of transparent material, of a projecting hood or casing arranged to project therefrom, and having means projecting transversely from the hood for securing the latter at different positions opposite said member.

2. The combination with a member of transparent material, of a protecting hood or casing arranged to project therefrom, means projecting from the hood for securing the latter at different positions opposite said member, and means whereby a yielding relation between the first mentioned means and the hood is maintained and shocks to the hood absorbed.

In testimony that I claim the foregoing as my own I have hereto affixed my signature in the presence of two subscribing witnesses.

BERT HENRY KRAFFT.

Witnesses:
JOHN T. DAILY,
FRANK E. DAILY.